Patented Aug. 26, 1952

2,608,298

UNITED STATES PATENT OFFICE 2,608,298

SELECTIVE RECOVERY OF MOLYBDENUM SULFIDE BY FLOTATION

Nathaniel Arbiter and Orel E. Young, Morenci, Ariz., assignors to Phelps Dodge Corporation, New York, N. Y., a corporation of New York No Drawing. Application April 6, 1948, Serial No. 19,424

12 Claims. (Cl. 209—167)

This invention relates to the separation by selective flotation of sulfide minerals from ores containing sulfides of other metals. More particularly, this invention is applicable to the separation of sulfide minerals, such as molybdenite, from flotation concentrates containing sulfides of other metals such as iron and copper.

Molybdenite ($MoS_2$) is the major source of the metal molybdenum and is found in sufficient amounts for economic recovery in a variety of ores, many of which include the sulfides of other metals such as copper and iron, as well as the molybdenite. Usually in such a mixed sulfide ore, the molybdenite is present only as a minor constituent, and in such cases its separation constitutes a real problem. The cost of such a separation has to be kept low in order to be competitive.

One method that has been used is to subject a flotation concentrate of the mixed sulfides to a further flotation step with the addition of a reagent such as dextrin to depress the flotation of the molybdenite. The concentrate from this operation is then refloated to separate a further amount of molybdenite, and the combined tailings containing the molybdenite have to be subjected to further treatments such as dewatering, roasting at 300° F. or above, repulping and additional cleaning.

Another method that depresses the copper and other metal sulfides involves a heat treatment, such as steaming in order to obtain a separation of the molybdenite from the copper and iron sulfides. Any such heat treatment adds to the expense of the process and requires the use of extra equipment. Also, a steaming treatment to produce depression of copper and iron is only effective when the original concentrate treated was obtained by using a xanthate as a collector.

One object of our invention is the provision of a method of recovering a sulfide mineral such as molybdenite from a flotation concentrate containing a small amount of the sulfide mineral and relatively large amounts of other metal sulfides by a simple flotation process involving the addition of inexpensive reagents in small amounts to depress effectively the sulfides of the other metals and allow the desired sulfide mineral or minerals to be recovered in the froth.

Another object of this invention is the provision of such a selective flotation method in which the depression of certain metal sulfides is accomplished without any heat treatment by the addition to or formation in the pulp of a polysulfide and a thiosulfate along with one or more water soluble metallic salts.

We have found that a combination of a polysulfide and a thiosulfate in a flotation medium, particularly when used in the presence of one or more water soluble metal salts, has a sufficient selective depressing effect on the flotability of certain metal sulfides, such as the sulfides of copper and iron, to permit other sulfide minerals, such as molybdenite, to be separated or concentrated in a froth. Such a treatment is effective when applied to a mixed sulfide flotation concentrate, even though he unthickened concentrate before such treatment contains the usual quantities of organic collector and frothing agent. In fact, such a treatment may be even more effective when applied to a repulped concentrate. The collector is either destroyed in some manner or rendered sufficiently ineffective by these reagents to permit efficient selective flotation in the treatment of such a concentrate. Also, we have found that some of the frother which may be in such a concentrate is likewise either destroyed or rendered innocuous by the presence of these reagents without any further treatment. In fact, it is usually necessary to add additional frothing agent in order to obtain froth of the type needed for the selective flotation treatment of the concentrate.

We have further discovered that the combination of a polysulfide and thiosulfate operates successfully, although either one alone in relatively pure form does not produce the same results. Any of the various polysulfides and thiosulfates that are sufficiently soluble in water, such as the salts of the common alkali and alkaline earth metals and of the ammonium radical, can be used for this purpose. One sample and economic method of preparing such a mixed polysulfide and thiosulfate reagent is by heating sulfur with an aqueous solution or suspension of alkali metal or alkaline earth metal hydroxide. The reaction product of such a treatment is a mixture containing substantial proportions of both the polysulfide and thiosulfate. For example, an aqueous suspension of lime may be heated with sulfur to form a mixture of calcium polysulfide and thiosulfate which is very effective as a selective depressing reagent in the treatment of mixed sulfide flotation concentrates. While our invention is not limited thereto, a good working range of proportions in preparing such a reagent is a product made by heating a mixture containing by weight on a dry basis 60 to 40% of CaO with 40 to 60% of sulfur.

Other methods may be used for preparing the mixture of polysulfide and thiosulfate. For example, the relatively pure compounds can be simply mixed in solution, or a solution of the soluble polysulfide such as sodium, potassium or ammonium polysulfide can be treated by addition of a soluble sulfite, or simply by aeration, to form in the polysulfide solution a suitable quantity of the thiosulfate. The particular manner in which the reagent is prepared is not vital, as long as the reagent added to the mixed sulfide concentrate contains a mixture of polysulfide and thiosulfate with substantial proportions of each being present.

In order to make this treatment fully effective for depressing certain sulfide minerals and allowing one or more others to be floated, it is desirable to have in the concentrate, or added to, or formed in the pulp obtained from the concentrate, a quantity of at least one water soluble inorganic metal salt. Such salts may be any soluble ferrous, ferric, copper, zinc, aluminum or other inorganic salts of metals other than the simple salts of the alkali and alkaline earth metals. The quantity of the salt to be added can be added conveniently to the pulp in solution either before or after the addition of the polysulfide and thiosulfate reagent. Such a pulp, after a short agitation, is then in condition for immediate treatment by selective flotation.

As an alternative, one economical and simple procedure for forming suitable quantities of metal salts in the pulp is by conditioning or treating the concentrate, or the pulp obtained therefrom, with a suitable mineral acid for a sufficient time to permit the acid to react and form the soluble metal salts. For this purpose, it is usually desirable to add a sufficient quantity of acid to reduce the pH of the concentrate to a point below 7. Mineral acids, such as sulfuric, sulfurous, hydrochloric, nitric and phosphoric acids are suitable for this purpose, although for economic reasons we prefer to use either sulfuric or sulfurous acid. While it is desirable in the use of acid to reduce the pH of the pulp below 7, no particular advantage is obtained by adding enough acid to reduce it below a pH of about 5 to 5.5. Since the poly-sulfide-thiosulfate solution is alkaline, the addition of this reagent, after the treatment with the acid has continued long enough to react and form soluble metal salts, usually raises the pH and, in some cases, brings it back to a point above the neutral point.

The particular proportion of these various reagents needed to produce an efficient separation of the feed mixture of sulfide minerals will vary of course with the particular ore or concentrate being treated. For most purposes, however, it is desirable to employ at least one pound of the polysulfide-thiosulfate mixture per ton of feed, and little advantage is gained by using more than eight pounds per ton of this reagent. For most purposes, we prefer to employ about three to six pounds of this reagent per ton of feed treated. The proportion of metal salts added to or formed in the concentrate pulp likewise may be varied, and in general may be in the same range used for the polysulfide-thiosulfate reagent.

In the operation of our process, the reagents may be simply added to the feed with appropriate agitation, sufficient time being allowed for the formation of metal salts if an acid is used for this purpose, and the pulp obtained from this treated feed is then subjected to the usual aeration and agitation in a conventional flotation cell with appropriate additions of collector or frother as may be necessary. As previously mentioned, we have found this treatment particularly effective for separating molybdenite from a mixed concentrate containing the sulfides of other metals, such as copper and iron, as well as the molybdenite. In fact, this treatment has been used very successfully in recovering molybdenite from a mixed sulfide concentrate containing as little as .2% of molybdenite. Also, it has been found to be effective in treating mixed sulfide concentrates obtained by flotation of ore in which either the conventional thiophosphate or xanthate was used as a collector. The process of our invention does not require the use of any fresh water to repulp the concentrate, or the use of any expensive roasting, steaming or other heat treatment of the concentrate.

In order that the invention may be more fully understood, the following examples of the treatment of such a concentrate are given.

EXAMPLE I

*Table I*

|  | 1 | 2 | 3 | 4 |
|---|---|---|---|---|
| Feed— |  |  |  |  |
| Percent Weight | 100.00 | 100.00 | 100.00 | 100.00 |
| Percent $MoS_2$ | 0.22 | 0.23 | 0.25 | 0.27 |
| Percent Cu | 25.71 | 25.51 | 25.42 | 25.09 |
| Percent Fe | 26.1 | 26.0 | 26.0 | 25.9 |
| Percent Sulphide | 88.3 | 87.9 | 87.8 | 87.3 |
| pH | 10.0 | 5.1 | 11.5 | 7.8 |
| $MoS_2$ Rougher Concentrate— |  |  |  |  |
| Percent Weight | 71.99 | 52.58 | 33.76 | 2.43 |
| Assay— |  |  |  |  |
| Percent $MoS_2$ | 0.242 | 0.418 | 0.704 | 10.08 |
| Percent Cu | 29.12 | 38.72 | 35.96 | 32.68 |
| Percent Fe | 24.8 | 20.4 | 20.6 | 12.6 |
| Percent Sulphide | 89.9 | 92.6 | 89.9 | 77.9 |
| Recovery— |  |  |  |  |
| Percent $MoS_2$ | 78.19 | 96.36 | 93.37 | 89.89 |
| Percent Cu | 81.54 | 79.79 | 47.76 | 3.16 |
| Percent Fe | 68.44 | 41.29 | 26.79 | 1.18 |
| Percent Sulphide | 73.28 | 55.41 | 34.58 | 2.17 |
| Middling—Percent Weight | 21.18 | 12.84 | 13.59 | 1.09 |
| Assay— |  |  |  |  |
| Percent $MoS_2$ | 0.223 | 0.043 | 0.078 | 1.10 |
| Percent Cu | 21.78 | 8.16 | 22.12 | 41.66 |
| Percent Fe | 30.0 | 38.0 | 29.8 | 13.3 |
| Percent Sulphide | 91.8 | 91.8 | 91.7 | 81.7 |
| Recovery— |  |  |  |  |
| Percent $MoS_2$ | 21.18 | 2.41 | 4.16 | 4.43 |
| Percent Cu | 17.94 | 4.11 | 11.82 | 1.79 |
| Percent Fe | 24.44 | 18.78 | 15.60 | 0.56 |
| Percent Sulphide | 22.02 | 13.42 | 14.20 | 1.02 |
| Tailing—Percent Weight | 6.83 | 34.58 | 52.65 | 96.48 |
| Assay— |  |  |  |  |
| Percent $MoS_2$ | 0.020 | 0.008 | 0.012 | 0.016 |
| Percent Cu | 1.94 | 11.88 | 19.52 | 24.72 |
| Percent Fe | 27.2 | 30.8 | 28.4 | 26.4 |
| Percent Sulphide | 60.8 | 79.2 | 85.4 | 87.6 |
| Recovery— |  |  |  |  |
| Percent $MoS_2$ | 0.63 | 1.23 | 2.47 | 5.68 |
| Percent Cu | 0.52 | 16.10 | 40.42 | 95.05 |
| Percent Fe | 7.12 | 39.93 | 57.61 | 98.26 |
| Percent Sulphide | 4.70 | 31.17 | 51.22 | 96.81 |
| Reagents—lbs./ton: |  |  |  |  |
| $H_2SO_4$ | 0.0 | 6.1 | 0.0 | 6.4 |
| Calcium Polysulphide-Thiosulphate | 0.0 | 0.0 | 4.2 | 4.2 |
| Burner Oil | 0.00 | 0.10 | 0.10 | 0.10 |
| Alcohol Frother | 0.05 | 0.05 | 0.05 | 0.10 |

It will be apparent from the foregoing example that the addition of the acid alone, as shown by column 2, produced a substantial increase in the amount of molybdenite in the rougher concentrate, although not a sufficient increase to warrant its use alone. The use of the polysulfide and thiosulfate mixture alone, as shown by column 3 in this example, produces a still further and useable increase in the molybdenite in the rougher concentrate with an attendant reduction in the amount of copper and iron sulfides in this concentrate. However, as shown by column 4, a combination of the polysulfide-thiosulfate and acid produced a striking increase in the concentration of molybdenite in the rougher concentrate and likewise reduced sharply the amounts of the sulfides of other metals in this concentrate. It will also be apparent that the other metal sulfides were almost completely depressed by the combination of the polysulfide-thiosulfate and acid, as shown by the analysis of the tailing under column 4.

EXAMPLE II

The following are the results obtained by a treatment of a mixed sulfide concentrate involving roughing and one cleaning step.

| | Assay—Percent | Distribution—Percent |
|---|---|---|
| Feed— | | |
| $MoS_2$ | 0.30 | 100 |
| Cu | 27.04 | 100 |
| Fe | 25.6 | 100 |
| Concentrate— | | |
| $MoS_2$ | 11.77 | 87.3 |
| Cu | 25.40 | 2.1 |
| Fe | 15.0 | 1.3 |
| Tailing— | | |
| $MoS_2$ | 0.039 | 12.7 |
| Cu | 27.08 | 97.9 |
| Fe | 25.8 | 98.7 |

Ratio of Concentration _____ 44.9
Reagents lbs./ton of feed:
  $H_2SO_4$ _____ 1.77
  $FeSO_4$ _____ 6.77
  Sodium polysulfide thiosulfate mixture _____ 7.01
  Methyl isobutyl carbinol _____ 0.15
  Utah fuel oil _____ 0.11

The rough concentrate obtained by our selective flotation can be re-treated one or more times by the same process, with intermediate regrinding, if necessary, or, in view of the high concentration of molybdenite obtainable by a single treatment, other methods of up-grading the rough concentrate may be used.

The terms and expressions which we have employed are used as terms of description and not of limitation, and we have no intention, in the use of such terms and expressions of excluding any equivalents of the features shown and described or portions thereof, but recognize that various modifications are possible within the scope of the invention claimed.

We claim:

1. In a flotation process of separating molybdenite from ores containing relatively large amounts of the sulfides of other metals, the step of subjecting a mixture of such molybdenite and other metal sulfides to flotation in the presence of a polysulfide and a thiosulfate together with salts produced by reaction of a mineral acid on the mixture to depress the flotation of sulfides other than said molybdenite.

2. In a flotation process of separating molybdenite from ores containing relatively large amounts of the sulfides of other metals, the step of subjecting a mixture of molybdenite and other metal sulfides to selective flotation in the presence of a polysulfide, a thiosulfate and a water soluble inorganic metal salt other than salts of alkali and alkaline earth metals to depress the flotation of sulfides other than molybdenum sulfide.

3. In a flotation process of separating molybdenite from ores containing relatively large amounts of the sulfides of other metals, the step of subjecting a mixture of such molybdenite and other metal sulfides to flotation in a flotation medium containing in solution a small proportion of a polysulfide, a thiosulfate and at least one water soluble inorganic metal salt other than salts of alkali and alkaline earth metals to depress the flotation of said other metal sulfides.

4. In a flotation process of separating molybdenite from ores containing relatively large amounts of the sulfides of other metals, the step of subjecting a mixture of such molybdenite and other metal sulfides to selective flotation in a flotation medium containing in solution small proportions of a polysulfide, a thiosulfate and metal salts formed by treatment of the mixture with an acid.

5. In a flotation process of separating molybdenite from a flotation concentrate containing a small amount of molybdenite and relatively large amounts of the sulfides of other metals, the step of treating said concentrate directly by flotation and adding thereto small amounts of a mineral acid and of a polysulfide and a thiosulfate to depress selectively the flotation of said sulfides of other metals.

6. In a flotation process of separating molybdenite from a flotation concentrate containing a small amount of molybdenite and relatively large amounts of the sulfides of other metals, the step of treating said concentrate directly by flotation and adding thereto small amounts of a mineral acid and of calcium polysulfide and thiosulfate.

7. In a flotation process of separating molybdenite from a flotation concentrate containing a small amount of molybdenite and relatively large amounts of the sulfides of other metals, the steps of treating said concentrate by adding thereto as a selective depressant for said other metal sulfides in the presence of at least one water soluble inorganic metal salt other than salts of alkali and alkaline earth metals, a reaction product of sulfur and a hydroxide of a metal selected from the group consisting of alkali and alkaline earth metals, and subjecting said concentrate to froth flotation.

8. In a flotation process of separating molybdenite from a flotation concentrate containing a small amount of molybdenite and relatively large amounts of the sulfides of other metals, the steps of conditioning said concentrate by adding thereto as a selective depressant for said other metal sulfides an acid and a reaction product of sulfur and a hydroxide of a metal selected from the group consisting of alkali and alkaline earth metals, and subjecting said conditioned concentrate to froth flotation.

9. A process of recovering molybdenite from a flotation concentrate containing a small amount of said molybdenite and larger amounts of the sulfides of other metals which comprises treating said concentrate with a mineral acid to form soluble metallic salts therein, adding to the concentrate a water soluble mixture of a polysulfide and a thiosulfate, and subjecting the concentrate to a selective flotation treatment to recover said molybdenite.

10. A process of recovering molybdenite from a flotation concentrate containing a small amount of molybdenite and larger amounts of copper and iron sulfides which comprises treating said concentrate with a mineral acid to form soluble metallic salts therein, adding to the concentrate a water soluble mixture of a polysulfide and a thiosulfate, and subjecting the concentrate to a selective flotation treatment to recover said molybdenite.

11. A process of recovering molybdenite from a flotation concentrate containing a small amount of molybdenite and larger amounts of copper and iron sulfides which comprises adding to the concentrate substantial quantities of at least one water soluble inorganic metal salt other than salts of alkali and alkaline earth metals, a soluble polysulfide and a soluble thiosulfate, and subjecting the concentrate to a selective flotation to float the molybdenite.

12. In a flotation process for separating selectively molybdenite from a mixture of such molybdenite with larger quantities of the sulfides of other metals, the steps of treating the mixture with a mineral acid, and subjecting the mixture to a selective flotation treatment in the presence of a reaction product made by heating sulfur and a hydroxide of a metal selected from the group consisting of alkali and alkaline earth metals.

NATHANIEL ARBITER.
OREL E. YOUNG.

REFERENCES CITED

The following references are of record in the file of this patent:

UNITED STATES PATENTS

| Number | Name | Date |
|---|---|---|
| 1,274,505 | Bradford | Aug. 6, 1918 |
| 1,478,697 | Bragg | Dec. 25, 1923 |
| 1,678,259 | Martin | July 24, 1928 |
| 1,721,993 | Green | July 23, 1929 |
| 2,449,984 | Gibbs | Sept. 28, 1948 |

FOREIGN PATENTS

| Number | Country | Date |
|---|---|---|
| 21,104 | Great Britain | of 1913 |
| 19,844 | Great Britain | of 1914 |

OTHER REFERENCES

Taggart, Handbook of Mineral Dressing, copyright 1945, section 12, page 110.